US009335737B2

(12) United States Patent
Yamaichi

(10) Patent No.: US 9,335,737 B2
(45) Date of Patent: May 10, 2016

(54) HOLOGRAPHIC IMAGE GENERATION AND RECONSTRUCTION

(71) Applicant: EMPIRE TECHNOLOGY DEVELOPMENT LLC, Wilmington, DE (US)

(72) Inventor: Eiji Yamaichi, Tokyo (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 303 days.

(21) Appl. No.: 13/992,745

(22) PCT Filed: Nov. 15, 2012

(86) PCT No.: PCT/US2012/065384
§ 371 (c)(1),
(2) Date: Jun. 9, 2013

(87) PCT Pub. No.: WO2014/077824
PCT Pub. Date: May 22, 2014

(65) Prior Publication Data
US 2014/0132710 A1     May 15, 2014

(51) Int. Cl.
*G03H 1/26* (2006.01)
*G03H 1/04* (2006.01)
(Continued)

(52) U.S. Cl.
CPC .............. *G03H 1/0443* (2013.01); *G02B 5/32* (2013.01); *G02B 26/0833* (2013.01);
(Continued)

(58) Field of Classification Search
CPC ... G02B 26/0833; G03H 1/00; G03H 1/0005; G03H 1/22; G03H 1/0891; G03H 1/2286; G03H 1/2292; G03H 1/2294; G03H 1/2202; G03H 2222/15; G03H 2222/34; G03H 2001/04; G03H 2001/0088; G03H 2001/2223; G03H 2001/2292; G03H 2001/0426; G03H 2001/0445; G03H 2001/0208; G03H 2001/0212; G03H 2001/2213–2001/2221; G03H 2260/52; G11B 7/0065; G11B 2007/00656
USPC ......................... 359/1, 27, 32–33; 348/40–41
See application file for complete search history.

(56) References Cited

U.S. PATENT DOCUMENTS 4,520,387 A *  5/1985  Cortellini ................. G03H 1/04
                                                        348/40
4,975,717 A     12/1990  Takemoto et al.
(Continued)

FOREIGN PATENT DOCUMENTS

JP          10-254338 A      9/1998

OTHER PUBLICATIONS

Yukikuni Akishige et al., "Identification of Photocharomic Absorption in KTaO3 Doped with Ni and Fe", Japanese Journal of Applied Physics, 1980, pp. 1633-1639, vol. 19, No. 9.
(Continued)

*Primary Examiner* — Derek S Chapel
(74) *Attorney, Agent, or Firm* — Ren-Sheng International

(57) ABSTRACT

Technologies are generally described for generating and recording holograms of an object using a plurality of light sources and an array of image sensors arranged to surround the object. In various examples, an apparatus may be configured to irradiate a plurality of light beams from multiple light sources to a corresponding number of beam splitters, which are configured to generate a first portion of the light beams that can be irradiated on the object, and a second portion of the light beams that can be reflected by a mirror unit to generate reference beams. Some apparatus can also include an array of image sensors that may be configured to receive images of interference caused by the reference beams and object beams scattered by the object.

16 Claims, 12 Drawing Sheets

(51) Int. Cl.
*G03H 1/08* (2006.01)
*G03H 1/22* (2006.01)
*G03H 1/30* (2006.01)
*G02B 5/32* (2006.01)
*G02B 26/08* (2006.01)
*G03H 1/00* (2006.01)

(52) U.S. Cl.
CPC .......... *G03H 1/0891* (2013.01); *G03H 1/2294* (2013.01); *G03H 1/30* (2013.01); *G03H 2001/0088* (2013.01); *G03H 2001/0426* (2013.01); *G03H 2001/0445* (2013.01); *G03H 2001/2292* (2013.01); *G03H 2222/15* (2013.01); *G03H 2222/34* (2013.01); *G03H 2226/11* (2013.01); *G03H 2226/13* (2013.01); *G03H 2260/52* (2013.01)

(56) References Cited

U.S. PATENT DOCUMENTS

| | | | | |
|---|---|---|---|---|
| 5,311,335 | A * | 5/1994 | Crabtree | 359/22 |
| 5,548,419 | A | 8/1996 | Adrian et al. | |
| 6,412,949 | B1 | 7/2002 | Halldorsson | |
| 6,961,161 | B2 | 11/2005 | Tsukagoshi et al. | |
| 7,027,197 | B2 * | 4/2006 | Newswanger | G02B 27/2271 |
| | | | | 359/23 |
| 7,672,209 | B2 | 3/2010 | Tateishi et al. | |
| 7,738,151 | B2 | 6/2010 | Garner et al. | |
| 8,054,519 | B2 | 11/2011 | Su et al. | |
| 2007/0211319 | A1 * | 9/2007 | Tomida | G03H 1/02 |
| | | | | 359/3 |
| 2015/0085069 | A1 * | 3/2015 | Yamaichi | H04N 5/372 |
| | | | | 348/40 |

OTHER PUBLICATIONS

Toshio Honda et al., "Display Technologies for Stereoscopic and Three Dimensional Images (II)—Holography—", Journal of the Institute of Image Electronics Engineers of Japan, 1991, pp. 391-402, vol. 20, No. 4.
Larry Hardesty, "3-D TV? How about holographic TV?" MIT News Office, Jan. 24, 2011, <Retrieved on Jun. 18, 2012>, pp. 1-3, Retrieved from the Internet at <URL: http://web.mit.edu/newsoffice/2011/video-holography-0124.html?tmpl=component&print=1>.
"Holography", Wikipedia, Last Modified on Jun. 16, 2012, <Retrieved on Jun. 18, 2012>, pp. 1-23, Retrieved from the Internet at <URL: http://en.wikipedia.org/wiki/Holography>.
"Volume Holographic Imaging", MIT 3D Optical Systems Group, <Retrieved on Apr. 15, 2013>, pp. 1-3, Retrieved from the Internet at <URL: http://3doptics.mit.edu/website/research/volume-holographic-imaging/>.
Jiaqi Chen et al., "Polygonal Prism based Holographic Fabrication for Three-Dimensional Polymer Photonic Crystal for Superprism", International Journal of Advances in Optical communication and Networks, Dec. 2010, vol. 1, No. 1.
Notification of Transmittal of the International Search Report and the Written Opinion of the International Searching Authority, PCT/US12/65384, Mar. 29, 2013.

* cited by examiner

HOLOGRAPHIC IMAGE GENERATION AND RECONSTRUCTION

CROSS-REFERENCE TO RELATED APPLICATION

The present application is a U.S. National Stage filing under 35 U.S.C. §371 of International Application PCT/US2012/065384, filed on Nov. 15, 2012 and entitled "HOLOGRAPHIC IMAGE GENERATION AND RECONSTRUCTION." The International Application, including any appendices or attachments thereof, is incorporated by reference herein in its entirety.

BACKGROUND

Unless otherwise indicated herein, the approaches described in this section are not prior art to the claims in this application and are not admitted to be prior art by inclusion in this section.

Holography techniques can be used to record holograms representing images of an object and reconstruct the images from the recorded holograms. As an example of conventional holography techniques, transmission-type holography techniques can be used to generate holograms of a two-dimensional or three-dimensional object on a transmitting side, for example, by means of a CCD (charge coupled device) camera. The holograms can be transmitted to a receiving side in the form of video signals. On the receiving side, the holograms can be displayed on a high-definition liquid crystal display panel constituted of pixels having a resolution of the order of the optical diffraction limit, based on fringe patterns contained in the received video signals. In particular, the hologram can be formed by irradiating a reconstruction light that readily causes interference, e.g., coherent light emitted from a laser light source, on the fringe patterns displayed on one side of the display panel. The irradiation of the reconstruction light on the fringe patterns causes diffraction in the fringe patterns, such that a user can observe the diffracted light as holographic images emitted from the other side of the display panel.

With the conventional holography technologies, reconstructed holographic images can typically be viewed from one direction or from one point of view. However, in some cases, there are demands for allowing the reconstructed stereoscopic images to be viewed from different directions.

SUMMARY

Technologies are generally described for generating stereoscopic holographic images and reconstructing the stereoscopic holographic images such that the images can be viewed from one or more different directions.

Various example holographic image generating apparatus described herein may include one or more of a plurality of light sources, a plurality of beam splitters, and/or a mirror unit. Each of the light sources may be configured to irradiate a light beam. Each of the beam splitters may be configured to split the light beam irradiated from a corresponding one of the light sources into a first portion and a second portion of the light beam, such that the first portion of the light beam is irradiated on an object and the second portion of the light beam is irradiated on a mirror unit. The mirror unit may be configured to reflect the second portions of the light beams to generate reference beams. Further, an array of image sensors arranged to surround the object may be configured to receive images of interference caused by the reference beams and the first portions of the light beams scattered by the object and further configured to convert the received images into image signals.

In some examples, a holographic image reconstructing apparatus is described such as any example apparatus described herein that may be adapted to utilize a receiving unit configured to receive input signals representing holograms of an object. The apparatus may be further adapted to utilize a plurality of ultraviolet light sources, each configured to generate a corresponding ultraviolet light beam based on a respective one of the input signals and irradiate the ultraviolet light beam on a scanning mirror. The scanning mirror may be configured to reflect each of the ultraviolet light beams to generate scan beams that are irradiated on a screen. The screen may be coated with a photochromic material and configured to receive the scan beams from the scanning mirror and form the holograms of the object on the screen due to visible light transmittance characteristics of the screen adjusted in response to the scan beams. Further, the apparatus may be adapted to utilize a plurality of reconstruction light sources, each configured to irradiate a reconstruction light beam on the screen to reconstruct images of the object.

In some examples, methods for generating holographic images are described. The example methods may include irradiating, by each of a plurality of light sources, a light beam. The light beam irradiated from a corresponding one of the plurality of light sources may be split, by each of a plurality of beam splitters, into a first portion and a second portion of the light beam such that the first portion of the light beam is irradiated on an object and the second portion of the light beam is irradiated on a mirror unit. The second portions of the light beams may be reflected, by the mirror unit, to generate reference beams. The methods may further include receiving, by an array of image sensors arranged to surround the object, images of interference caused by the reference beams and the first portions of the light beams scattered by the object. The received images may be converted into image signals.

In some examples, methods for reconstructing holographic images are described. The example methods may include receiving, by a receiving unit, input signals representing holograms of an object. A corresponding ultraviolet light beam may be generated, by each of a plurality of ultraviolet light sources, based on a respective one of the input signals and irradiated on a scanning mirror. Each of the ultraviolet light beams may be reflected, by the scanning mirror, to generate scan beams that are irradiated on a screen coated with a photochromic material. Visible light transmittance characteristics of the screen may be adjusted in response to the scan beams to form the holograms of the object on the screen. Some methods may further include irradiating, by each of a plurality of reconstruction light sources, a reconstruction light beam on the screen to reconstruct images of the object.

In some examples, a computer-readable storage medium is described that may be adapted to store a program for causing a processor to generate holographic images. The processor may include various features as further described herein. The program may include one or more instructions for irradiating, by each of a plurality of light sources, a light beam, and splitting, by each of a plurality of beam splitters, the light beam irradiated from a corresponding one of the plurality of light sources into a first portion and a second portion of the light beam such that the first portion of the light beam is irradiated on an object and the second portion of the light beam is irradiated on a mirror unit. The program may further include one or more instructions for reflecting, by the mirror unit, the second portions of the light beams to generate reference beams, receiving, by an array of image sensors arranged to surround the object, images of interference caused by the reference beams and the first portions of the light beams scattered by the object, and converting the received images into image signals.

In some examples, a computer-readable storage medium is described that may be adapted to store a program for causing a processor to reconstruct holographic images. The processor may include various features as further described herein. The program may include one or more instructions for receiving, by a receiving unit, input signals representing holograms of an object, and generating, by each of a plurality of ultraviolet light sources, a corresponding ultraviolet light beam based on a respective one of the input signals and irradiating the ultraviolet light beam on a scanning mirror. The program may further include one or more instructions for reflecting, by the scanning mirror, each of the ultraviolet light beams to generate scan beams, receiving the scan beams from the scanning mirror, by a screen coated with a photochromic material, to form the holograms of the object on the screen due to visible light transmittance characteristics of the screen adjusted in response to the scan beams, and irradiating, by each of a plurality of reconstruction light sources, a reconstruction light beam on the screen to reconstruct images of the object.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
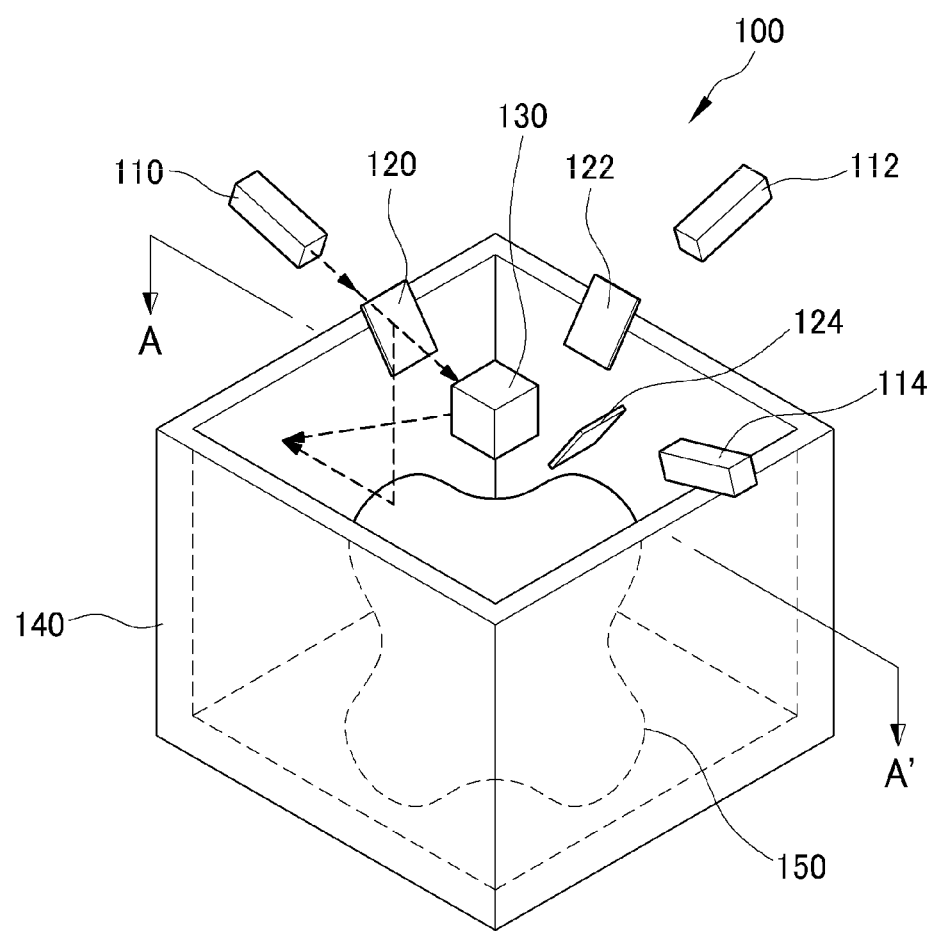
FIG. 1 schematically shows a perspective view of an illustrative example holographic image generating apparatus.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices and computer program products related to generating and reconstructing stereoscopic holographic images.

Briefly stated, technologies are generally described for generating and recording holograms of an object using a plurality of light sources and an array of image sensors arranged to surround the object. In various examples, an apparatus is described, where the apparatus may be configured to transmit a plurality of light beams from multiple light sources to a corresponding number of beam splitters, which are configured to generate a first portion of the light beams that can be irradiated on the object, and a second portion of the light beams that can be reflected by a mirror unit to generate reference beams. Some apparatus can also include an array of image sensors that may be configured to receive images of interference caused by the reference beams and object beams scattered by the object.

In some embodiments, the images received by the image sensors may be converted into image signals, which may be recorded in a storage unit. The image signals may be transmitted to a holographic image reconstructing apparatus.

In some embodiments, the array of image sensors may include an array of CCDs (charge coupled devices) and may be arranged in a shape of a cylinder or a polygonal prism.

In some embodiments, the holographic image reconstructing apparatus may be configured to receive the image signals and generate ultraviolet light beams from a plurality of ultraviolet light sources based on the image signals. The ultraviolet light beams may be reflected by a scanning mirror to generate scan beams that are irradiated on a screen, which may be coated with a photochromic material, and configured to form the holograms of the object on the screen due to visible light transmittance characteristics of the screen adjusted in response to the scan beams. Further, a plurality of reconstruction light beams may be irradiated on the screen such that images of an object can be reconstructed based on the holograms.

In some embodiments, the photochromic material may include one or more materials selected from the group consisting of potassium tantalate ($KTaO_3$) and strontium titanate ($SrTiO_3$) doped with an impurity such as nickel (Ni). Alternatively, the photochromic material may include HABI (hexaarylbiimidazole).

In some embodiments, the screen may be arranged in a shape of a cylinder or a polygonal prism. Further, the scanning mirror may be actuated by any reasonable mechanism, for example magnetically actuated, electrically actuated, or electromagnetically actuated.

FIG. 1 schematically shows a perspective view of an illustrative example holographic image generating apparatus, arranged in accordance with at least some embodiments described herein. As depicted, a holographic image generating apparatus 100 may include a plurality of light sources 110, 112, and 114, each being configured to irradiate (or transmit) a light beam towards a corresponding beam splitter 120, 122 or 124. Each of beam splitters 120, 122 and 124 may be configured to split the light beam received from the corresponding light source 110, 112 or 114, into a first portion and a second portion of the light beam. The first portion of the light beam may be irradiated on an object 150, which may be surrounded by an image sensing unit 140. In the meantime, the second portion of the light beam may be irradiated on a mirror unit 130. Mirror unit 130 may be configured to reflect the second portions of the light beams to generate reference beams, such that the first portions of the light beams, which may be scattered by object 150 and the reference beams may cause interference patterns to be formed on image sensing unit 140. Image sensing unit 140 may receive images of the interference patterns and convert the images into image signals. This operation of forming and receiving interference patterns at image sensing unit 140 will be described in detail later with reference to FIG. 2.

In FIG. 1, three light sources 110, 112 and 114 and corresponding three beam splitters 120, 122 and 124 are illustrated for the sake of explanation. However, the number of light sources and beam splitters are not to be limited thereto. In some examples two pairs or more than three pairs of light sources and beam splitters may be arranged depending on the desired implementation.

In some embodiments, image sensing unit 140 may include an array of image sensors. For example, image sensing unit 140 may include an array of CCDs and any other types of imaging sensors. Also, the array of image sensors may be arranged in a shape of a polygonal prism such as a rectangular prism shown in FIG. 1. Alternatively, the array of image sensors may be arranged in a shape of a cylinder or any other shapes.

In some embodiments, each of light sources 110, 112 and 114 may be configured to irradiate a coherent light beam such as a visible laser beam. Also, each of beam splitters 120, 122 and 124 may be implemented using a half-mirror including an aluminum layer formed on a glass substrate.

Figure 2:
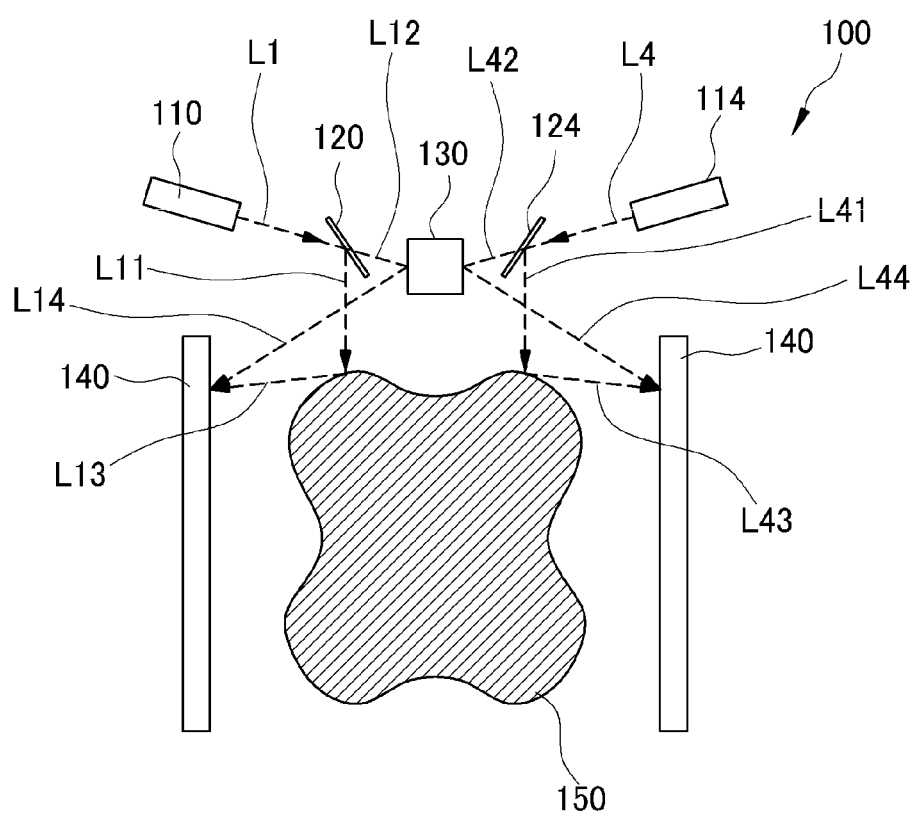
FIG. 2 schematically shows a cross-sectional view of an illustrative example holographic image generating apparatus.

FIG. 2 illustrates a cross-sectional view of an illustrative example holographic image generating apparatus, arranged in accordance with at least some embodiments described herein. In particular, FIG. 2 depicts a cross-sectional view of holographic image generating apparatus 100, which is taken along a line A-A' of the apparatus illustrated in FIG. 1. As depicted, each of the beam splitters 120 or 124 may split a light beam L1 or L4 irradiated from the corresponding light source 110 or 114, into a first portion L11 or L41 and a second portion L12 or L42.

Beam splitter 120 may be configured to collaboratively operate with light source 110 and mirror unit 130. For example, beam splitter 120 may be configured to reflect a first portion L11 of light beam L1, where the first portion L11 can be irradiated on object 150. Object 150 may be surrounded by image sensing unit 140. Beam splitter 120 may also be configured to transmit a second portion L12 of light beam L1, which can be irradiated on mirror unit 130. Mirror unit 130 may be configured to reflect second portion L12 of the light beam L1 to generate a reference beam L14. In this illustrative configuration, an object beam L13 may result from at least a portion of light beam L11 being scattered by object 150, and reference beam L14 may cause interference patterns to be formed on an inner surface of image sensing unit 140.

Beam splitter 124 is arranged to operate similar to beam splitter 120, where beam splitter 124 may be configured to collaboratively operate with light source 114 and mirror unit 130. For example, beam splitter 124 may be configured to reflect a first portion L41 of light beam L4, where first portion L41 can be irradiated on object 150. Beam splitter 124 may also be configured to transmit a second portion L42 of light beam L4 to mirror unit 130, which may be configured to reflect second portion L42 of the light beam L4 to generate another reference beam L44. Another object beam L43 may result from at least a portion of light beam L41 being scattered by object 150, and reference beam L44 may cause interference patterns to be formed on an inner surface of image sensing unit 140.

When two light beams (e.g., L14 and L13; or L44 and L43) reach the inner surface of image sensing unit 140, the light waves may intersect and interfere with each other. The interference pattern formed by the intersecting light waves may represent the manner in which the scene's light from object 150 interferes with the original light source. Image sensors in image sensing unit 140 may be configured to detect and receive images of the interference patterns and convert the received images into image signals for further processing, which will be described later.

Figure 3:
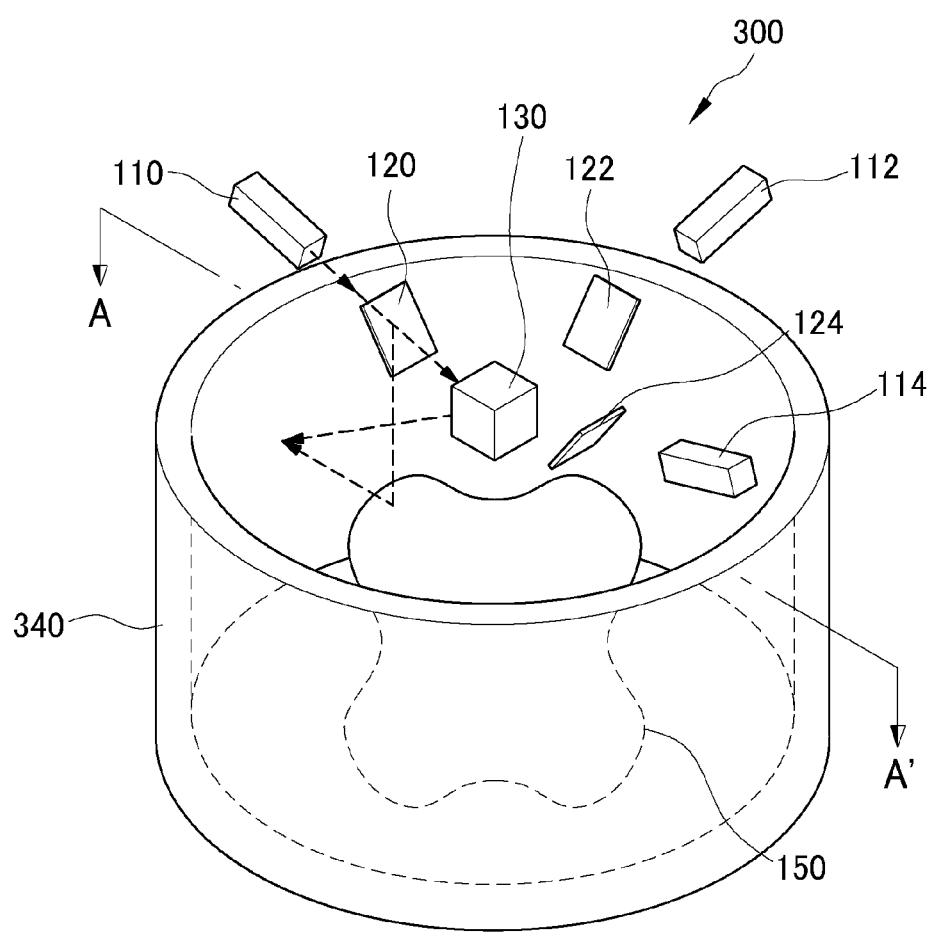
FIG. 3 schematically shows a perspective view of another illustrative example holographic image generating apparatus.

FIG. 3 schematically shows a perspective view of another illustrative example holographic image generating apparatus, arranged in accordance with at least some embodiments described herein. A holographic image generating apparatus 300 has a similar configuration to holographic image generating apparatus 100 as shown in FIGS. 1 and 2, except for that an image sensing unit 340 is arranged in a shape of a cylinder. As depicted, image sensing unit 340 may have a cylindrical inner surface where an array of imaging sensors (e.g., CCD sensor devices) may be arranged. In an alternative embodiment, image sensing unit 340 may have any other suitable shape of the inner surface, such as a cylindroid or a polygonal prism.

Similar to holographic image generating apparatus 100 shown in FIGS. 1 and 2, apparatus 300 may include a plurality of light sources 110, 112, and 114, each configured to irradiate a light beam towards a corresponding beam splitter 120, 122 or 124. Each of beam splitters 120, 122 and 124 may be configured to collaboratively operate with light source 110, 112 and 114, respectively. For example, beam splitter 120 may be configured to split the light beam irradiated from light source 110 into a first portion and a second portion of the light beam, where the first portion of the light beam can be irradiated on object 150. Object 150 may be surrounded by image sensing unit 340. Beam splitter 120 may also be configured to transmit the second portion of the light beam, which can be irradiated on mirror unit 130. Mirror unit 130 may reflect the second portions of the light beams to generate reference beams. In this illustrative configuration, object beams may result from at least a port of the light beams being scattered by object 150, and the reference beams may cause interference patterns to be formed on image sensing unit 140. Image sensing unit 140 may receive images of the interference patterns and convert the images into image signals for further processing.

Figure 4:
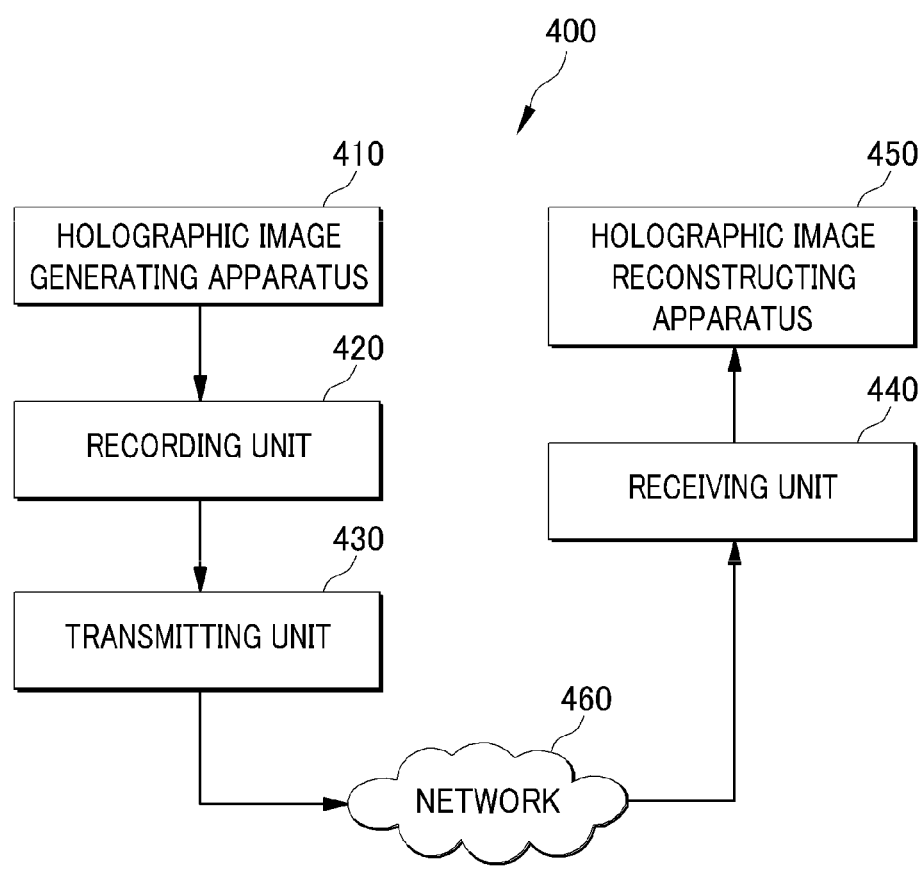
FIG. 4 schematically shows a block diagram of an illustrative example holographic imaging system including a holographic image generating apparatus coupled to a holographic image reconstructing apparatus through a network.

In some embodiments, the image signals generated by holographic image generating apparatus 100 or 300 according to the above embodiments may be recorded in a local storage unit and/or transmitted to a holographic image reconstructing apparatus. FIG. 4 schematically shows a block diagram of an illustrative example holographic imaging system including a holographic image generating apparatus coupled to a holographic image reconstructing apparatus through a network, in accordance with at least some embodiments described herein. As depicted, a holographic imaging system 400 may include a holographic image generating apparatus 410, which may be coupled to a recording unit 420 and a transmitting unit 430. Transmitting unit 430 may be coupled to receiving unit 440 through one or more networks 460. Receiving unit 440 may be coupled to a holographic imaging reconstruction apparatus 450.

In some embodiments, holographic image generating apparatus 410 may have a similar configuration to holographic image generating apparatus 100 or 300 as shown in FIGS. 1 to 3. Holographic image generating apparatus 410 may be configured to generate image signals in a manner as described above with reference to FIGS. 1 to 3. Thus generated digital image signals may be transmitted and recorded in recording unit 420. The image signals recorded in recording unit 420 may be read by transmitting unit 430 and sent to a remote device, such as a receiving unit 440 or a holographic image reconstructing apparatus 450, through a network 460. Receiving unit 440 may be configured to receive the image signals from transmitting unit 430 and transmit the image signals to holographic image reconstructing apparatus 450.

Figure 5:
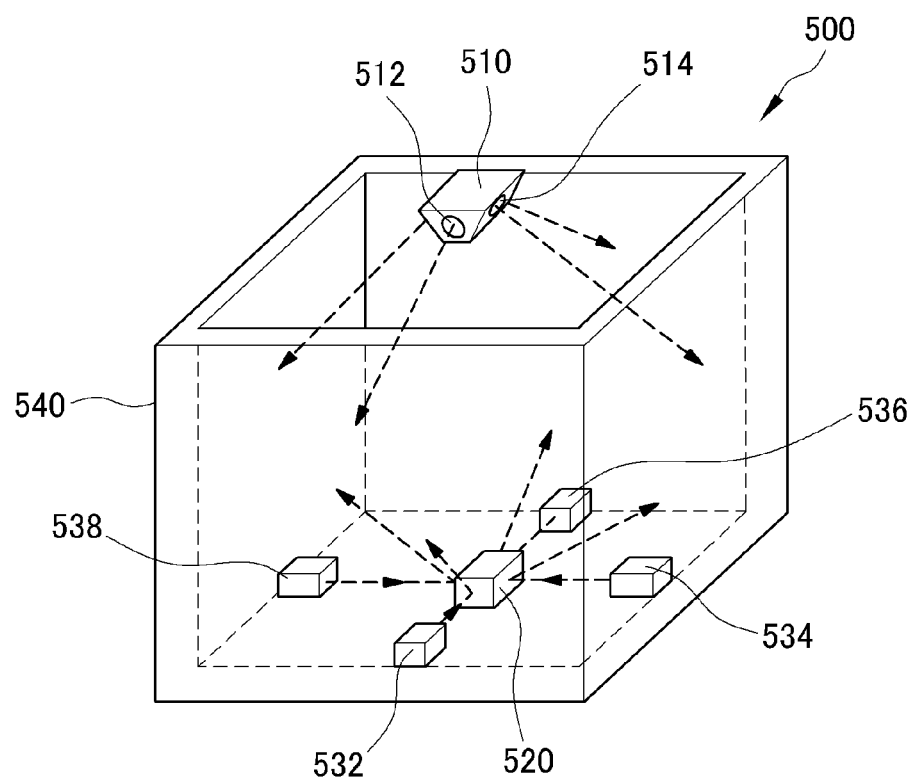
FIG. 5 schematically shows a perspective view of an illustrative example holographic image reconstructing apparatus.

In some embodiments, holographic image reconstructing apparatus 450 may be configured to reconstruct images of object 150 based on the received image signals. FIG. 5 schematically shows a perspective view of an illustrative example holographic image reconstructing apparatus, arranged in accordance with at least some embodiments described herein.

As shown in FIG. 5, a holographic image reconstructing apparatus 500 may include a plurality of ultraviolet light sources 532, 534, 536 and 538, each configured to generate an ultraviolet light beam, such as an ultraviolet laser beam, based on holographic image signals. In some embodiments, the holographic image signals may be provided from a holographic image generating apparatus such as holographic image generating apparatus 100, 300 or 410 in FIGS. 1 to 4. Thus generated ultraviolet light beams may have intensities which may vary based on the levels of the holographic image signals. Ultraviolet light sources 532, 534, 536 and 538 may be configured to irradiate the generated ultraviolet light beams onto a scanning mirror 520. Scanning mirror 520 may be configured to reflect the ultraviolet light beams and generate a scan beam that is irradiated on a screen 540.

In some embodiments, screen 540 may be coated with a photochromic material and configured to form holograms of an object, such as object 150, due to a visible light transmittance of screen 540 adjusted in response to the ultraviolet light beams to form holograms of an object, such as object 150. For example, screen 540 may include a photochromic material formed on a transparent layer. The transparent layer may be formed of at least one of a glass material, a transparent plastic material and PET (polyethylene terephthalate). The photochromic material may include at least one of $KTaO_3$ and $SrTiO_3$ doped with an impurity such as Ni. Additionally or alternatively, the photochromic material may include an organic photochromic material such as HABI (hexaarylbiimidazole).

In some embodiments, when screen 540 coated with a photochromic material such as $KTaO_3$ doped with Ni is irradiated with the ultraviolet light beams, electrons in the photochromic material may be excited by the ultraviolet light beams and trapped in complex defects formed by the impurity Ni and oxygen vacancies. Specifically, one or two electrons may be trapped by a complex defect of an Ni ion with an oxygen vacancy VO at the center ($Ni^{3+}$–VO), whereby the complex defect ($Ni^{3+}$–VO) becomes ($Ni^{3+}$–VO–2e) or ($Ni^{3+}$–VO–e). Complex defects having trapped electrons may exhibit sufficiently wide absorption characteristics for light with visible spectrum. In particular, ($Ni^{3+}$–VO–2e) has a light absorption peak at the wavelength of 630 nm and has a wide absorption band.

On screen 540 coated with the photochromic material having the above-described characteristics, holograms may be formed by changing a visible light transmittance of the photochromic material in response to the varying intensities of the ultraviolet light beams. That is, images of an object corresponding to the holographic image signals may be formed on screen 540 in the form of images representing varying visible light transmittance.

In some embodiments, holographic image reconstructing apparatus 500 may further include a reconstruction light unit 510, which may include a plurality of reconstruction light sources, such as 512 and 514. Each of these reconstruction light sources may be configured to irradiate a reconstruction light beam, such as a visible laser beam, on screen 540. When the holograms formed on screen 540 are irradiated with the reconstruction light beams, images of the object may be reconstructed.

As illustrated in FIG. 5, screen 540 may be arranged in a shape of a polygonal prism such as a rectangular prism. Alternatively, screen 540 may be arranged in a shape of a cylinder or any other shapes such as a cylindroid. Also, scanning mirror 520 may be actuated by any variety of mechanisms such as magnetic actuation, electrical actuation, or electromagnetic actuation, wherein the actuation of the scanning mirror 520 is effective to steer the scan beam (e.g., actuation may facilitate a change the direction of ultraviolet light beams reflected on surfaces of scanning mirror 520).

Figure 6:
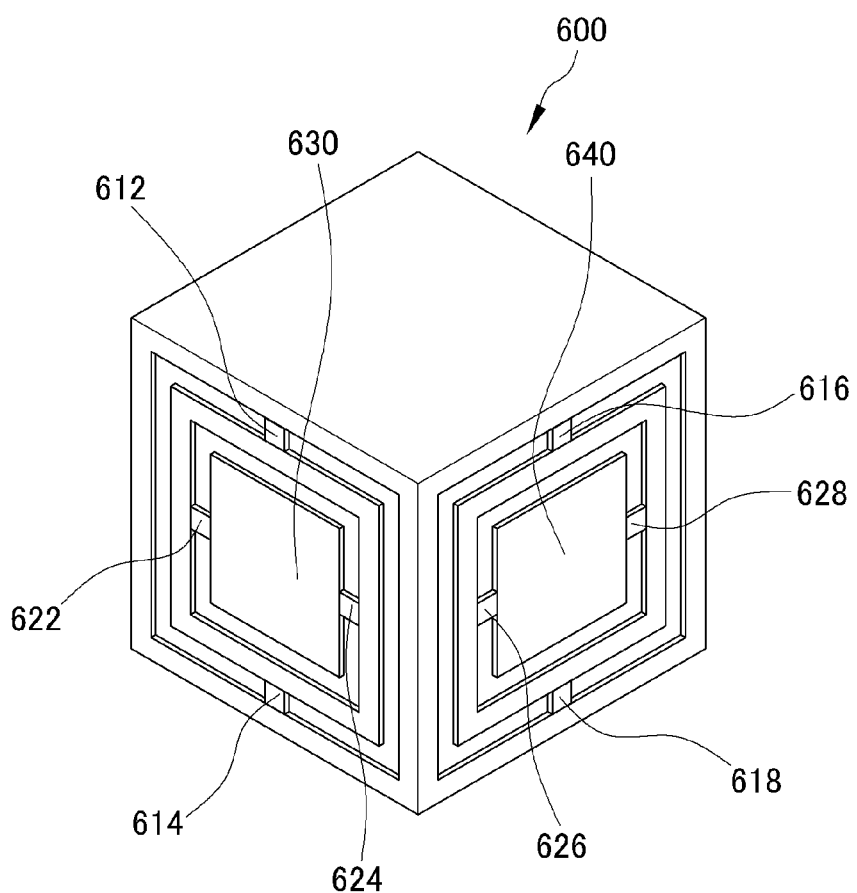
FIG. 6 schematically shows a perspective view of an illustrative example scanning mirror that may be used in a holographic image reconstructing apparatus.

FIG. 6 schematically shows a perspective view of an illustrative example scanning mirror that may be used in a holographic image reconstructing apparatus, in accordance with at least some embodiments described herein. As depicted, a scanning mirror 600 may include vertical axis 612, 614, 616 and 618, along which mirror portions 630 and 640 may be actuated to rotate in a horizontal direction. Further, scanning mirror 600 may include horizontal axis 622, 624, 626 and 628, along which mirror portions 630 and 640 may be actuated to rotate in a vertical direction.

In some embodiments, the rotational actuation of mirror portions 630 and 640 may be driven by electric, magnetic, or electromagnetic forces, which may be again generated based on electric control signals provided from a holographic image reconstructing apparatus such as holographic image reconstructing apparatus 500 in FIG. 5. In some examples, scanning mirror 600 may be implemented using MEMS (microelectro-mechanical systems) technologies, in which mirror portions 630 and 640 may be actuated by piezoelectric force, which may be again generated based on electric control signals provided from the holographic image reconstructing apparatus.

Figure 7:
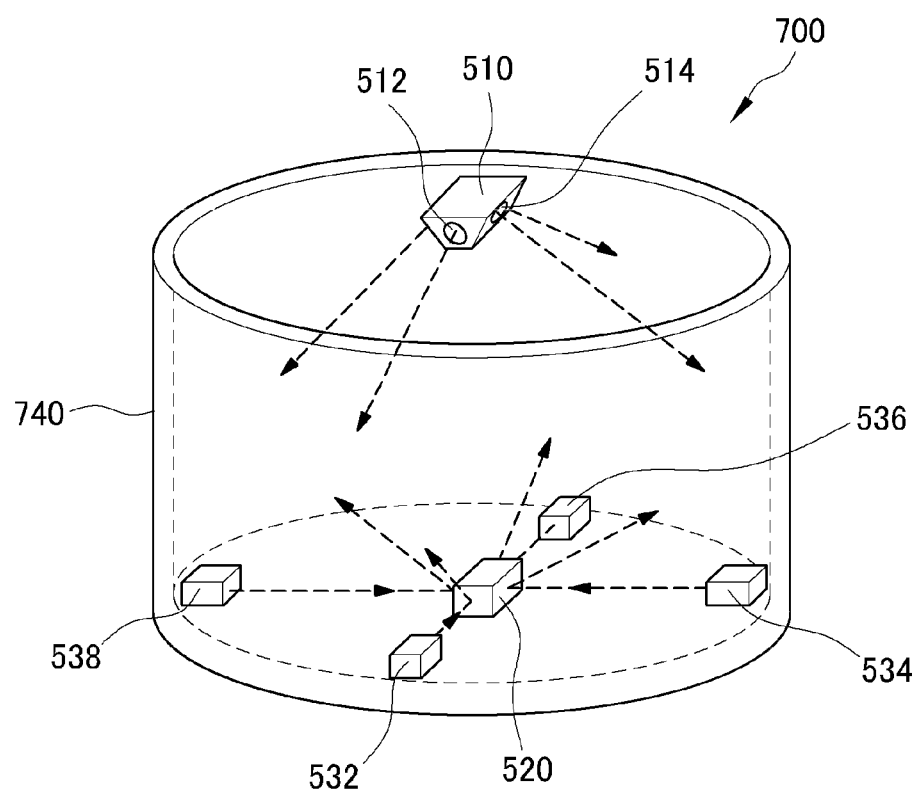
FIG. 7 schematically shows a perspective view of another illustrative example holographic image reconstructing apparatus.

FIG. 7 schematically shows a perspective view of another illustrative example holographic image reconstructing apparatus, arranged in accordance with at least some embodiments described herein.

A holographic image reconstructing apparatus 700 has a similar configuration to holographic image reconstructing apparatus 500 as shown in FIG. 5, except for that a screen 740 is arranged in a shape of a cylinder. As depicted, screen 740 may have a cylindrical inner surface coated with a photochromic material.

Similar to holographic image reconstructing apparatus 500 shown in FIG. 5, apparatus 700 may include a plurality of ultraviolet light sources 532, 534, 536 and 538, each configured to generate an ultraviolet light beam based on holographic image signals, which may be provided from a holographic image generating apparatus such as holographic image generating apparatus 100, 300 or 410 in FIGS. 1 to 4. Ultraviolet light sources 532, 534, 536 and 538 may be configured to irradiate the generated ultraviolet light beams onto a scanning mirror 520. Scanning mirror 520 may be configured to reflect the ultraviolet light beams and generate a scan beam that is irradiated on screen 740.

In some embodiments, screen 740 coated with a photochromic material may be configured to form holograms of an object due to a visible light transmittance of screen 740 adjusted in response to the ultraviolet light beams. On screen 540 coated with the photochromic material, holograms may be formed by changing a visible light transmittance of the photochromic material in response to the varying intensities of the ultraviolet light beams. That is, images of an object corresponding to the holographic image signals may be formed on screen 540 in the form of images representing varying visible light transmittance.

In some embodiments, holographic image reconstructing apparatus 700 may further include a reconstruction light unit 510, which may include a plurality of reconstruction light sources, such as 512 and 514. Each of these reconstruction light sources may be configured to irradiate a reconstruction light beam, such as a visible laser beam, on screen 540. When the holograms formed on screen 540 are irradiated with the reconstruction light beams, images of the object may be reconstructed.

Figure 8:
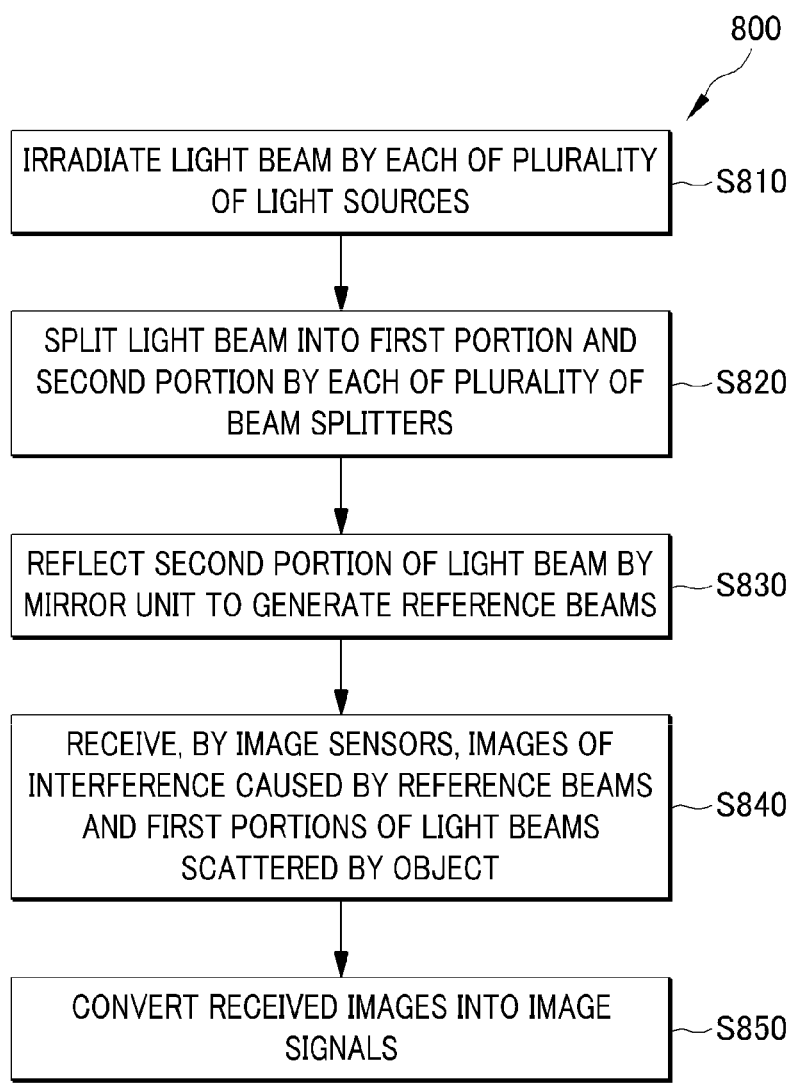
FIG. 8 illustrates an example flow diagram of a method adapted to generate holographic images.

FIG. 8 illustrates an example flow diagram of a method adapted to generate holographic images, arranged in accordance with at least some embodiments described herein. An example method 800 in FIG. 8 may be implemented using, for example, a computing device including a processor adapted to generate holographic images.

Method 800 may include one or more operations, actions, or functions as illustrated by one or more of blocks S810, S820, S830, S840 and/or S850. Although illustrated as discrete blocks, various blocks may be divided into additional blocks, combined into fewer blocks, or eliminated, depending on the desired implementation. In some further examples, the various described blocks may be implemented as a parallel process instead of a sequential process, or as a combination thereof. Method 800 may begin at block S810, "IRRADIATE LIGHT BEAM BY EACH OF PLURALITY OF LIGHT SOURCES."

At block S810, a light beam may be irradiated by each of a plurality of light sources. As depicted in FIGS. 1 to 3, each of a plurality of light sources 110, 112, and 114 may be configured to irradiate (or transmit) a light beam towards a corresponding beam splitter 120, 122 or 124. Block S810 may be followed by block S820, "SPLIT LIGHT BEAM INTO FIRST PORTION AND SECOND PORTION BY EACH OF PLURALITY OF BEAM SPLITTERS."

At block S820, the light beam may be split into a first portion and a second portion by each of a plurality of beam splitters. As illustrated in FIGS. 1 to 3, each of beam splitters 120, 122 and 124 may split the light beam received from the corresponding light source 110, 112 or 114, into a first portion and a second portion of the light beam. In some embodiments, the first portion of the light beam may be irradiated on object 150, which may be surrounded by image sensing unit 140. In the meantime, the second portion of the light beam may be irradiated on mirror unit 130. Block S820 may be followed by block S830, "REFLECT SECOND PORTION OF LIGHT BEAM BY MIRROR UNIT TO GENERATE REFERENCE BEAMS."

At block S830, the second portions of the light beams may be reflected by a mirror unit to generate reference beams. As illustrated in FIGS. 1 to 3, mirror unit 130 may reflect the second portions of the light beams to generate reference beams, such that object beams, which are the first portions of the light beams being scattered by object 150, and the reference beams may cause interference patterns to be formed on image sensing unit 140. Block S830 may be followed by block S840, "RECEIVE, BY IMAGE SENSORS, IMAGES OF INTERFERENCE CAUSED BY REFERENCE BEAMS AND FIRST PORTIONS OF LIGHT BEAMS SCATTERED BY OBJECT."

At block S840, images of interference caused by the reference beams and the first portions of the light beams scattered by the object may be received by image sensors. As depicted in FIGS. 1 to 3, image sensing unit 140 may be configured to detect and receive images of the interference patterns caused by object beams, which are the first portions of the light beams being scattered by object 150, and the reference beams. Block S840 may be followed by block S850, "CONVERT RECEIVED IMAGES INTO IMAGE SIGNALS."

At block S850, the images received by the image sensors may be converted into image signals. For example, as shown in FIGS. 1 to 3, image sensing unit 140 may be adapted to convert the images of the interference patterns into image signals, which may be recorded in a recording unit and/or transmitted to a holographic image reconstructing apparatus.

Figure 9:
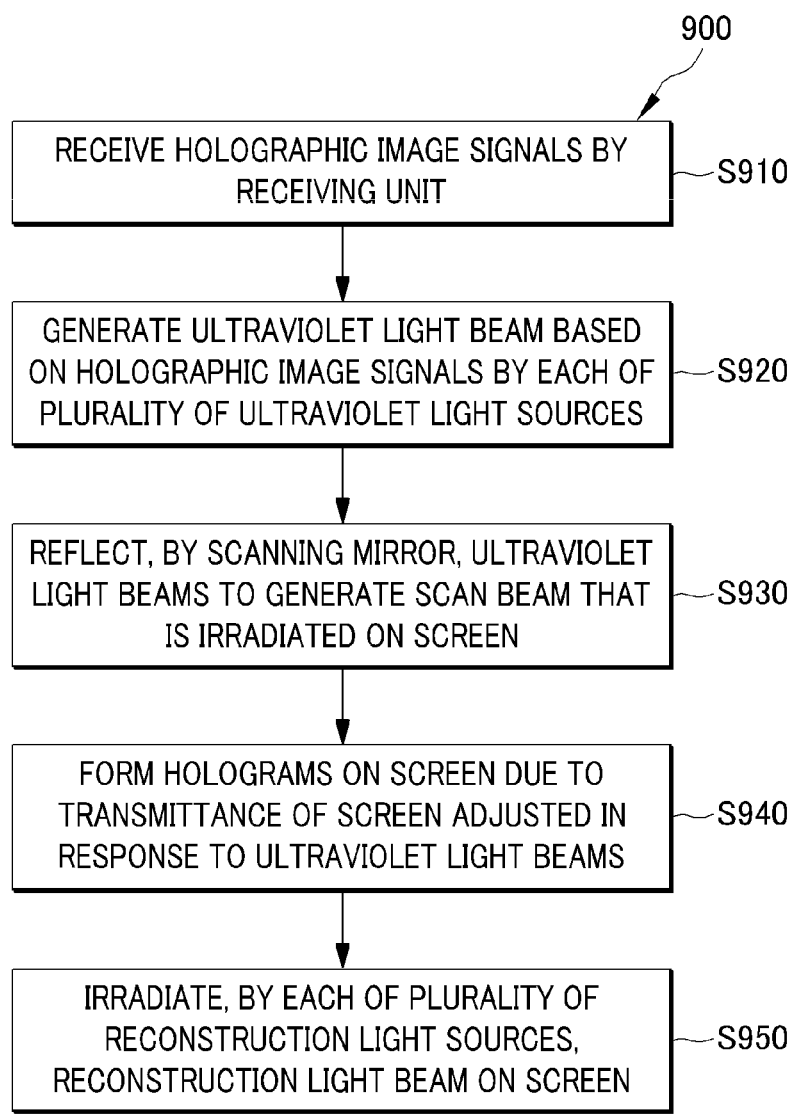
FIG. 9 illustrates an example flow diagram of a method adapted to reconstruct holographic images.

FIG. 9 illustrates an example flow diagram of a method adapted to reconstruct holographic images, arranged in accordance with at least some embodiments described herein. An example method 900 in FIG. 9 may be implemented using, for example, a computing device including a processor adapted to reconstruct holographic images.

Method 900 may include one or more operations, actions, or functions as illustrated by one or more of blocks S910, S920, S930, S940 and/or S950. Although illustrated as discrete blocks, various blocks may be divided into additional blocks, combined into fewer blocks, or eliminated, depending on the desired implementation. In some further examples, the various described blocks may be implemented as a parallel process instead of a sequential process, or as a combination thereof. Method 900 may begin at block S910, "RECEIVE HOLOGRAPHIC IMAGE SIGNALS BY RECEIVING UNIT."

At block S910, holographic image signals may be received by a receiving unit. For example, as depicted in FIG. 4, receiving unit 440 may receive holographic image signals from holographic image generating apparatus 410 or transmitting unit 430 coupled to holographic image generating apparatus 410, through one or more networks 460. Block S910 may be followed by block S920, "GENERATE ULTRAVIOLET LIGHT BEAM BASED ON HOLOGRAPHIC IMAGE SIGNALS BY EACH OF PLURALITY OF ULTRAVIOLET LIGHT SOURCES."

At block S920, ultraviolet light beams may be generated based on the holographic image signals by a plurality of ultraviolet light sources. As illustrated in FIGS. 5 to 7, each of a plurality of ultraviolet light sources 532, 534, 536 and 538 may be arranged to generate an ultraviolet light beam based on holographic image signals, which may be provided from a holographic image generating apparatus such as holographic image generating apparatus 100, 300 or 410 in FIGS. 1 to 4. Ultraviolet light sources 532, 534, 536 and 538 may be configured to irradiate the generated ultraviolet light beams onto scanning mirror 520. Block S920 may be followed by block S930, "REFLECT, BY SCANNING MIRROR, ULTRAVIOLET LIGHT BEAMS TO GENERATE SCAN BEAM THAT IS IRRADIATED ON SCREEN."

At block S930, the ultraviolet light beams may be reflected by a scanning mirror to generate a scan beam that is irradiated on a screen. As depicted in FIGS. 5 to 7, scanning mirror 520 may reflect the ultraviolet light beams from ultraviolet light sources 532, 534, 536 and 538, and generate a scan beam that is irradiated on screen 540 or 740 coated with a photochromic material. Block S930 may be followed by block S940, "FORM HOLOGRAMS ON SCREEN DUE TO TRANSMITTANCE OF SCREEN ADJUSTED IN RESPONSE TO ULTRAVIOLET LIGHT BEAMS."

At block S940, a visible light transmittance of the screen may be adjusted in response to the ultraviolet light beams to form holograms on the screen. For example, as shown in FIGS. 5 to 7, a visible light transmittance of screen 540 or 740 may be changed in response to the ultraviolet light beams reflected from scanning mirror 520 to form holograms of an object. Specifically, images of an object corresponding to the holographic image signals may be formed on screen 540 or 730 in the form of images representing the varying visible light transmittance. Block S940 may be followed by block S950, "IRRADIATE, BY EACH OF PLURALITY OF RECONSTRUCTION LIGHT SOURCES, RECONSTRUCTION LIGHT BEAM ON SCREEN."

At block S950, reconstruction light beams from a plurality of reconstruction light sources may be irradiated on the screen. As shown in FIGS. 5 to 7, each of reconstruction light sources 512 and 514 may irradiate a reconstruction light beam, such as a visible laser beam, on screen 540 or 740. When the holograms formed on screen 540 or 740 are irradiated with the reconstruction light beams, images of the object may be reconstructed.

One skilled in the art will appreciate that, for this and other methods disclosed herein, the functions performed in the methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 10:
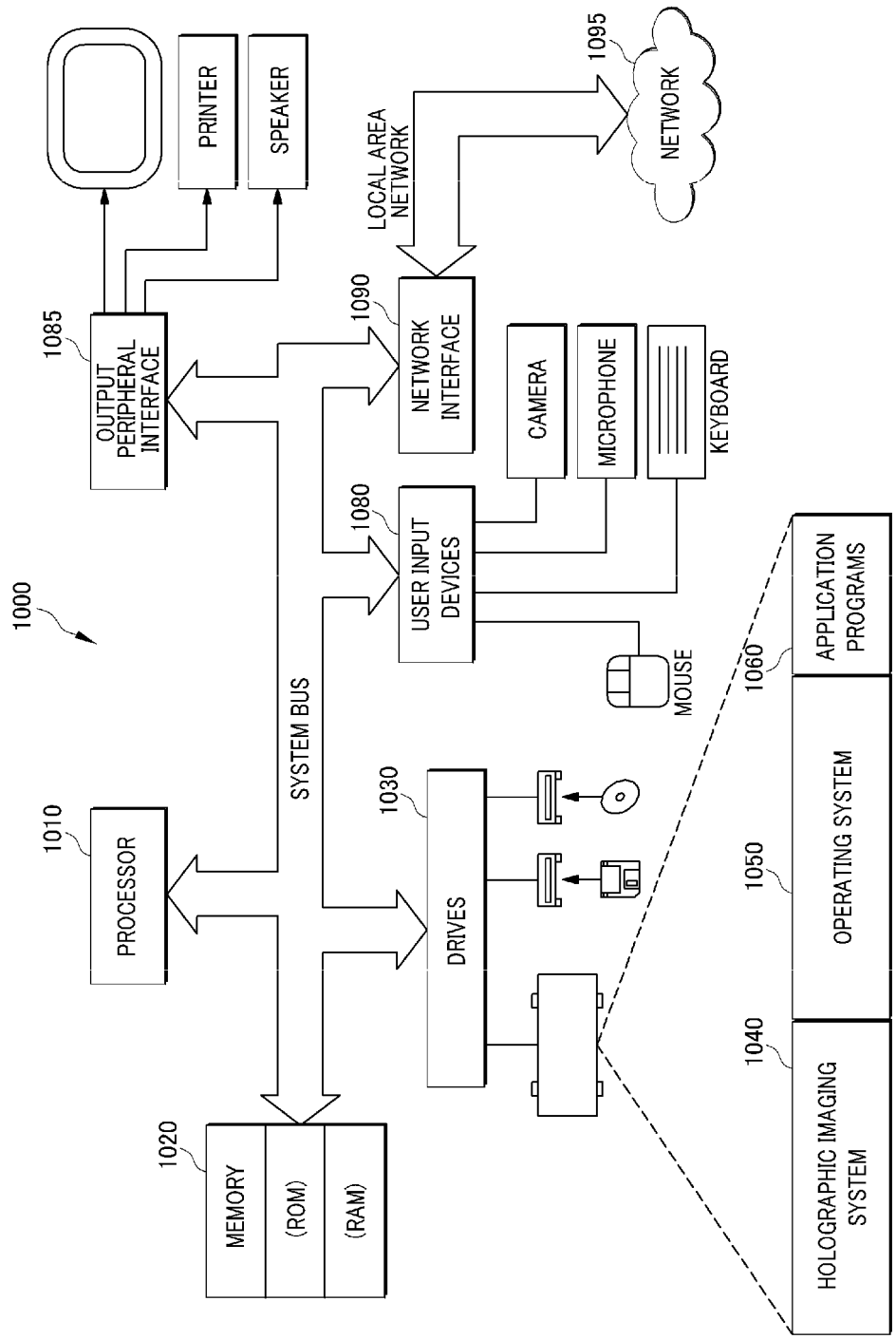
FIG. 10 shows a schematic block diagram illustrating an example computing system that can be configured to perform methods for generating and/or reconstructing holographic images.

FIG. 10 shows a schematic block diagram illustrating an example computing system that can be configured to perform methods for generating and/or reconstructing holographic images, arranged in accordance with at least some embodiments described herein. As depicted in FIG. 10, a computer 1000 may include a processor 1010, a memory 1020 and one or more drives 1030. Computer 1000 may be implemented as a conventional computer system, an embedded control computer, a laptop, or a server computer, a mobile device, a set-top box, a kiosk, a vehicular information system, a mobile telephone, a customized machine, or other hardware platform.

Drives 1030 and their associated computer storage media may provide storage of computer readable instructions, data structures, program modules and other data for computer 1000. Drives 1030 may include a holographic imaging system 1040, an operating system (OS) 1050, and application programs 1060. Holographic imaging system 1040 may be adapted to control a holographic image generating apparatus and/or a holographic image reconstructing apparatus in such a manner as described above with respect to FIGS. 1 to 9.

Computer 1000 may further include user input devices 1080 through which a user may enter commands and data. Input devices can include an electronic digitizer, a camera, a microphone, a keyboard and pointing device, commonly referred to as a mouse, trackball or touch pad. Other input devices may include a joystick, game pad, satellite dish, scanner, or the like.

These and other input devices can be coupled to processor 1010 through a user input interface that is coupled to a system bus, but may be coupled by other interface and bus structures, such as a parallel port, game port or a universal serial bus (USB). Computers such as computer 1000 may also include other peripheral output devices such as display devices, which may be coupled through an output peripheral interface 1085 or the like.

Computer 1000 may operate in a networked environment using logical connections to one or more computers, such as a remote computer coupled to a network interface 1090. The remote computer may be a personal computer, a server, a router, a network PC, a peer device or other common network node, and can include many or all of the elements described above relative to computer 1000.

Networking environments are commonplace in offices, enterprise-wide area networks (WAN), local area networks (LAN), intranets, and the Internet. When used in a LAN or WLAN networking environment, computer 1000 may be coupled to the LAN through network interface 1090 or an adapter. When used in a WAN networking environment, computer 1000 typically includes a modem or other means for establishing communications over the WAN, such as the Internet or a network 1095. The WAN may include the Internet, the illustrated network 1095, various other networks, or any combination thereof. It will be appreciated that other mechanisms of establishing a communications link, ring, mesh, bus, cloud, or network between the computers may be used.

In some embodiments, computer 1000 may be coupled to a networking environment. Computer 1000 may include one or more instances of a physical computer-readable storage medium or media associated with drives 1030 or other storage devices. The system bus may enable processor 1010 to read code and/or data to/from the computer-readable storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 1020, whether characterized as RAM, ROM, flash, or other types of volatile or nonvolatile memory technology. The media may also represent secondary storage, whether implemented as storage drives 1030 or otherwise. Hard drive implementations may be characterized as solid state, or may include rotating media storing magnetically encoded information.

Processor 1010 may be constructed from any number of transistors or other circuit elements, which may individually or collectively assume any number of states. More specifically, processor 1010 may operate as a state machine or finite-state machine. Such a machine may be transformed to a second machine, or specific machine by loading executable instructions. These computer-executable instructions may transform processor 1010 by specifying how processor 1010 transitions between states, thereby transforming the transistors or other circuit elements constituting processor 1010 from a first machine to a second machine. The states of either machine may also be transformed by receiving input from user input devices 1080, network interface 1090, other peripherals, other interfaces, or one or more users or other actors. Either machine may also transform states, or various physical characteristics of various output devices such as printers, speakers, video displays, or otherwise.

Figure 11:
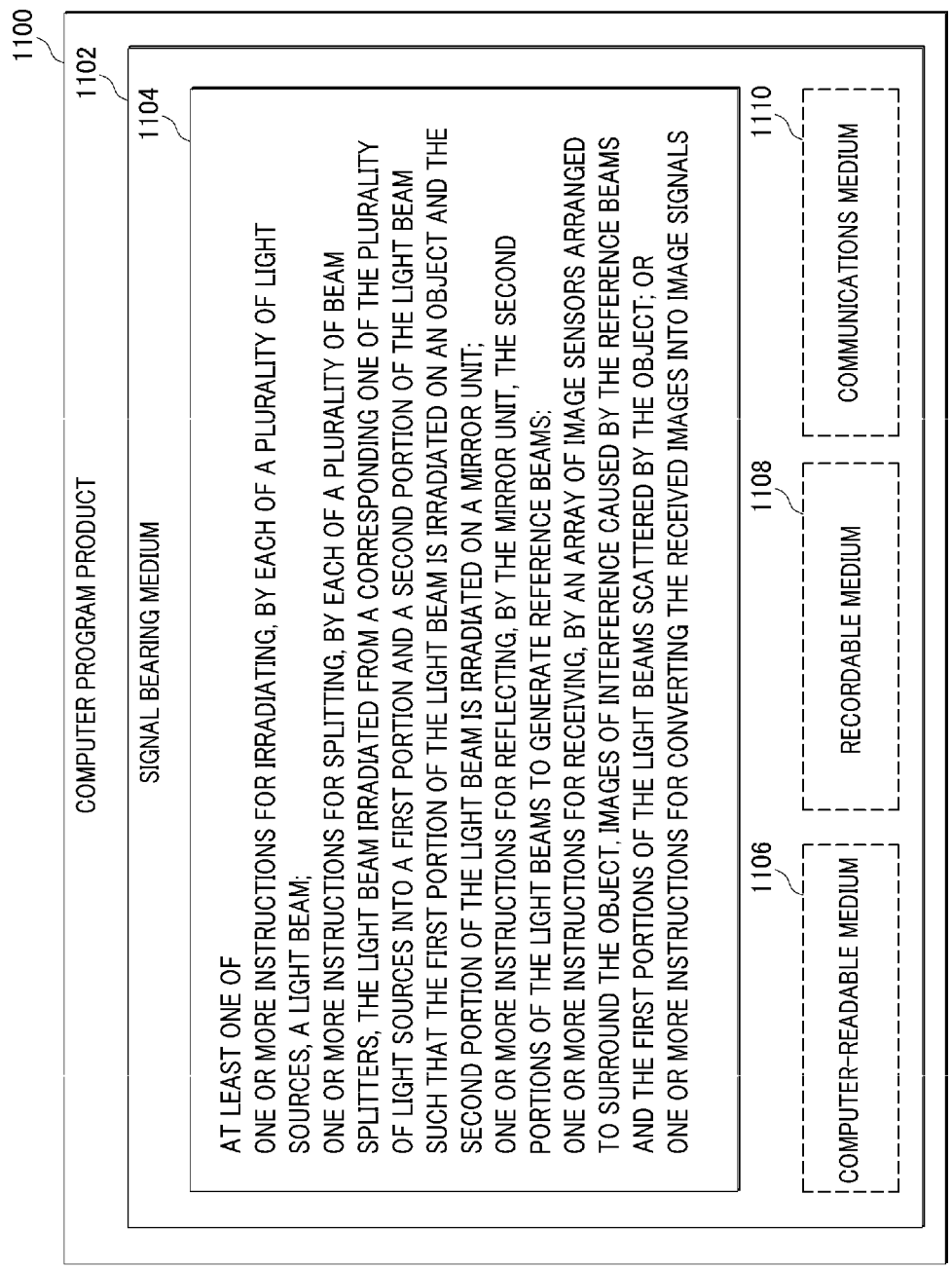
FIG. 11 illustrates a computer program product that can be utilized to generate holographic images.

FIG. 11 illustrates a computer program product 1100 that can be utilized to operate a holographic image generating apparatus in accordance with at least some embodiments described herein. Program product 1100 may include a signal bearing medium 1102. Signal bearing medium 1102 may include one or more instructions 1104 that, when executed by, for example, a processor, may provide the functionality described above with respect to FIGS. 1 to 9. By way of example, instructions 1104 may include: one or more instructions for irradiating, by each of a plurality of light sources, a light beam; one or more instructions for splitting, by each of a plurality of beam splitters, the light beam irradiated from a corresponding one of the plurality of light sources into a first portion and a second portion of the light beam such that the first portion of the light beam is irradiated on an object and the second portion of the light beam is irradiated on a mirror unit; one or more instructions for reflecting, by the mirror unit, the second portions of the light beams to generate reference beams; one or more instructions for receiving, by an array of image sensors arranged to surround the object, images of interference caused by the reference beams and the first portions of the light beams scattered by the object; or one or more instructions for converting the received images into image signals. Thus, for example, referring to FIGS. 1 to 3, holographic image generating apparatus 100 or 300 may undertake one or more of the blocks shown in FIG. 8 in response to instructions 1104.

Figure 12:
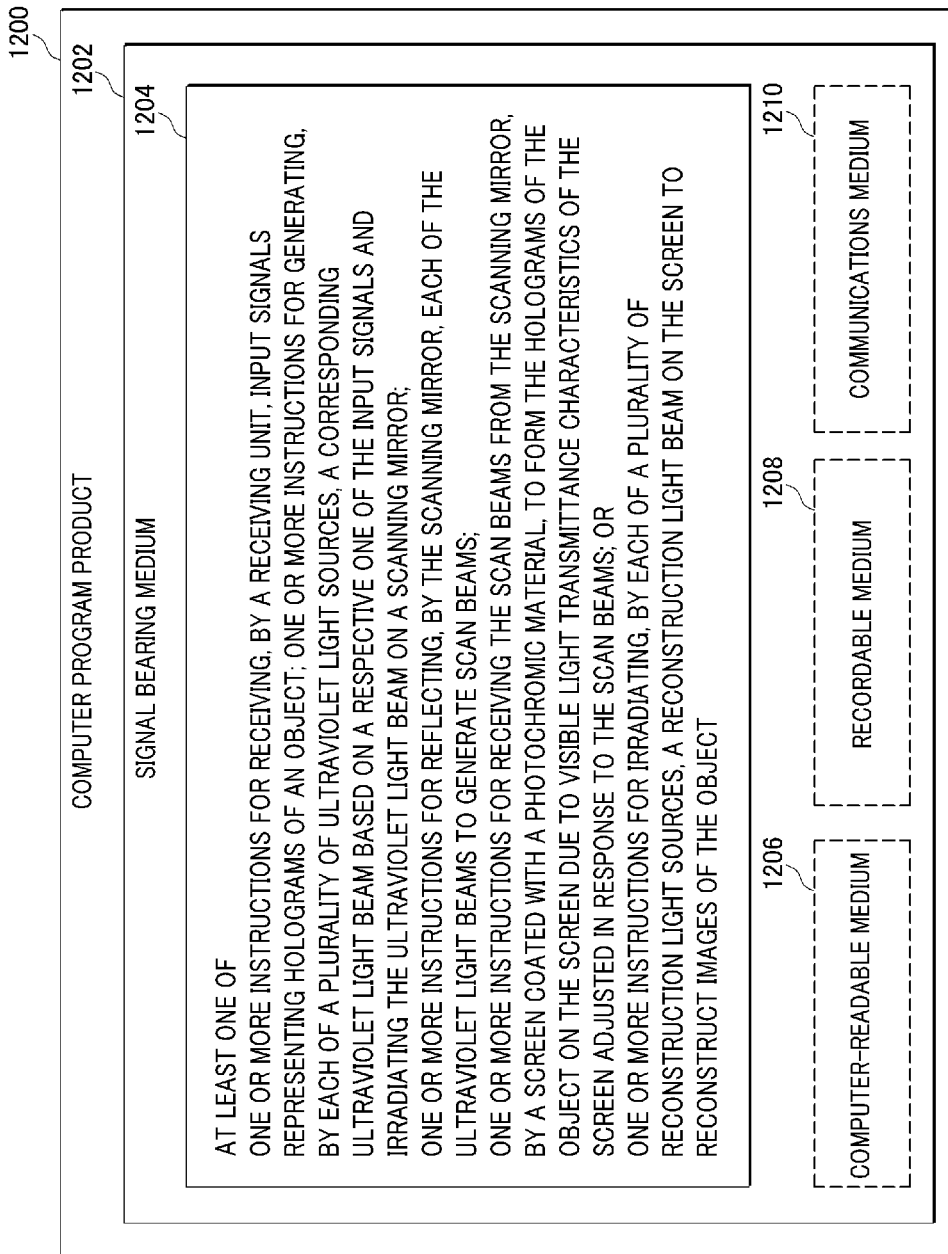
FIG. 12 illustrates a computer program product that can be utilized to reconstruct holographic images, all arranged in accordance with at least some embodiments described herein.

FIG. 12 illustrates a computer program product 1200 that can be utilized to operate a holographic image reconstructing apparatus in accordance with at least some embodiments described herein. Program product 1200 may include a signal bearing medium 1202. Signal bearing medium 1202 may include one or more instructions 1204 that, when executed by, for example, a processor, may provide the functionality described above with respect to FIGS. 1 to 9. By way of example, instructions 1204 may include: one or more instructions for receiving, by a receiving unit, input signals representing holograms of an object; one or more instructions for generating, by each of a plurality of ultraviolet light sources, a corresponding ultraviolet light beam based on a respective one of the input signals and irradiating the ultraviolet light beam on a scanning mirror; one or more instructions for reflecting, by the scanning mirror, each of the ultraviolet light beams to generate scan beams; one or more instructions for receiving the scan beams from the scanning mirror, by a screen coated with a photochromic material, to form the holograms of the object on the screen due to visible light transmittance characteristics of the screen adjusted in response to the scan beams; or one or more instructions for irradiating, by each of a plurality of reconstruction light sources, a reconstruction light beam on the screen to reconstruct images of the object. Thus, for example, referring to FIGS. 5 to 7, holographic image reconstructing apparatus 500 or 700 may undertake one or more of the blocks shown in FIG. 9 in response to instructions 1204.

In some implementations, signal bearing medium 1102 or 1202 may encompass a computer-readable medium 1106 or 1206, such as, but not limited to, a hard disk drive, a Compact Disc (CD), a Digital Video Disk (DVD), a digital tape, memory, etc. In some implementations, signal bearing medium 1102 or 1202 may encompass a recordable medium 1108 or 1208, such as, but not limited to, memory, read/write (R/W) CDs, R/W DVDs, etc. In some implementations, signal bearing medium 1102 or 1202 may encompass a communications medium 1110 or 1210, such as, but not limited to, a digital and/or an analog communication medium (e.g., a fiber optic cable, a waveguide, a wired communications link, a wireless communication link, etc.). Thus, for example, program product 1100 or 1200 may be conveyed to one or more modules of holographic image generating apparatus 100 or 300 or holographic image reconstructing apparatus 500 or 700 by an RF signal bearing medium 1102 or 1202, where the signal bearing medium 1102 or 1202 is conveyed by a wireless communications medium 1110 or 1210 (e.g., a wireless communications medium conforming with the IEEE 802.11 standard).

The present disclosure is not to be limited in terms of the particular embodiments described in this application, which are intended as illustrations of various aspects. Many modifications and variations may be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application.

The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A holographic image reconstruction apparatus, comprising:
    a unit configured to receive input signals representing holograms of an object;
    a plurality of ultraviolet light sources, each configured to generate a corresponding ultraviolet light beam based on a respective one of the input signals and irradiate the ultraviolet light beam on a scanning mirror;
    the scanning mirror configured to reflect each of the ultraviolet light beams to generate scan beams;
    a screen configured to surround the plurality of ultraviolet light sources and the scanning mirror and configured to receive the scan beams which are steered at a plurality of angles by the scanning mirror, wherein the screen is coated with a photochromic material and is effective to form the holograms of the object on the screen due to visible light transmittance characteristics of the screen adjusted in response to the scan beams; and
    a plurality of reconstruction light sources, each configured to irradiate a reconstruction light beam on the screen to reconstruct images of the object.

2. The apparatus of claim 1, wherein the screen includes the photochromic material formed on a transparent layer.

3. The apparatus of claim 2, wherein the transparent layer is formed of a glass material.

4. The apparatus of claim 2, wherein the transparent layer is formed of a transparent plastic material or polyethylene terephthalate (PET).

5. The apparatus of claim 2, wherein the photochromic material includes one or more materials selected from a group consisting of potassium tantalite ($KTaO_3$) and strontium titanate ($SrTiO_3$) doped with an impurity.

6. The apparatus of claim 5, wherein the impurity includes nickel (Ni).

7. The apparatus of claim 2, wherein the photochromic material includes hexaarylbiimidazole (HABI).

8. The apparatus of claim 1, wherein the screen is arranged in a shape of a cylinder or a polygonal prism.

9. The apparatus of claim 1, wherein the unit is configured to receive the input signals from a holographic image generation apparatus.

10. The apparatus of claim 1, wherein each of the ultraviolet light sources is configured to irradiate an ultraviolet laser beam.

11. The apparatus of claim 1, wherein each of the reconstruction light sources is configured to irradiate a visible laser beam.

12. The apparatus of claim 1, wherein the scanning mirror is magnetically actuated or electromagnetically actuated.

13. A method to reconstruct holographic images, comprising:

receiving, by a unit, input signals representing holograms of an object;

generating, by each of a plurality of ultraviolet light sources, a corresponding ultraviolet light beam based on a respective one of the input signals and irradiating the ultraviolet light beam on a scanning mirror;

reflecting, by the scanning mirror, each of the ultraviolet light beams to generate scan beams;

receiving the scan beams which are steered at a plurality of angles by the scanning mirror, by a screen that surrounds the plurality of ultraviolet light sources and the scanning mirror and is coated with a photochromic material, to form the holograms of the object on the screen due to visible light transmittance characteristics of the screen adjusted in response to the scan beams; and irradiating, by each of a plurality of reconstruction light sources, a reconstruction light beam on the screen to reconstruct images of the object.

14. The method of claim 13, wherein the receiving input signals includes receiving, by the unit, the input signals from a holographic image generation apparatus.

15. A non-transitory computer-readable storage medium which stores a program to reconstruct holographic images, the program comprising one or more instructions that are executable by a processor to perform or cause to be performed:

receiving, by a unit, input signals representing holograms of an object;

generating, by each of a plurality of ultraviolet light sources, a corresponding ultraviolet light beam based on a respective one of the input signals and irradiating the ultraviolet light beam on a scanning mirror;

reflecting, by the scanning mirror, each of the ultraviolet light beams to generate scan beams;

receiving the scan beams which are steered at a plurality of angles by the scanning mirror, by a screen that surrounds the plurality of ultraviolet light sources and the scanning mirror and is coated with a photochromic material, to form the holograms of the object on the screen due to visible light transmittance characteristics of the screen adjusted in response to the scan beams; and irradiating, by each of a plurality of reconstruction light sources, a reconstruction light beam on the screen to reconstruct images of the object.

16. The non-transitory computer-readable storage medium of claim 15, wherein to receive input signals representing holograms of the object, the program comprises one or more instructions that are executable by the processor to perform or cause to be performed: receiving, by the unit, the input signals from a holographic image generation apparatus.

* * * * *